July 24, 1951
A. MACQ
2,561,669
DISTILLING AND RECTIFYING APPARATUS
Filed April 29, 1946
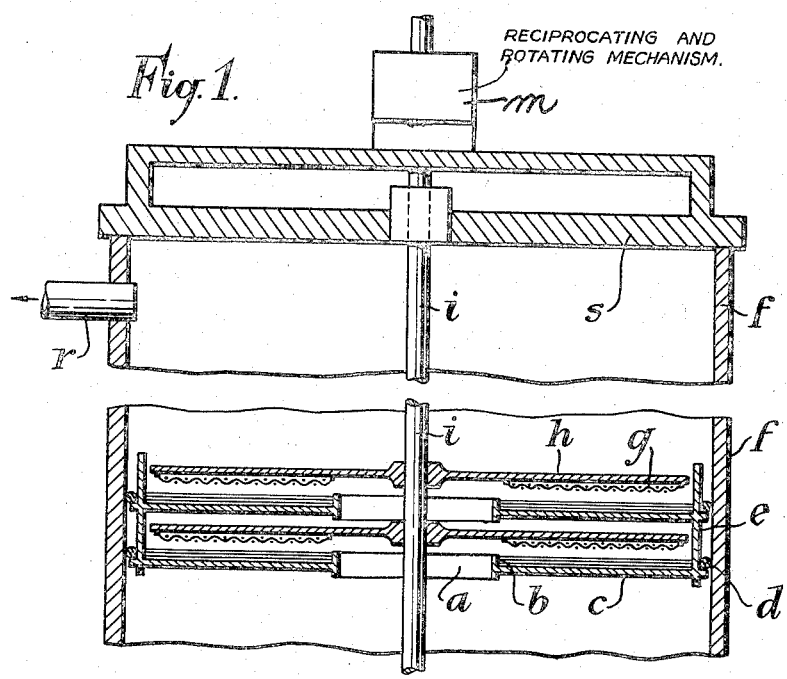
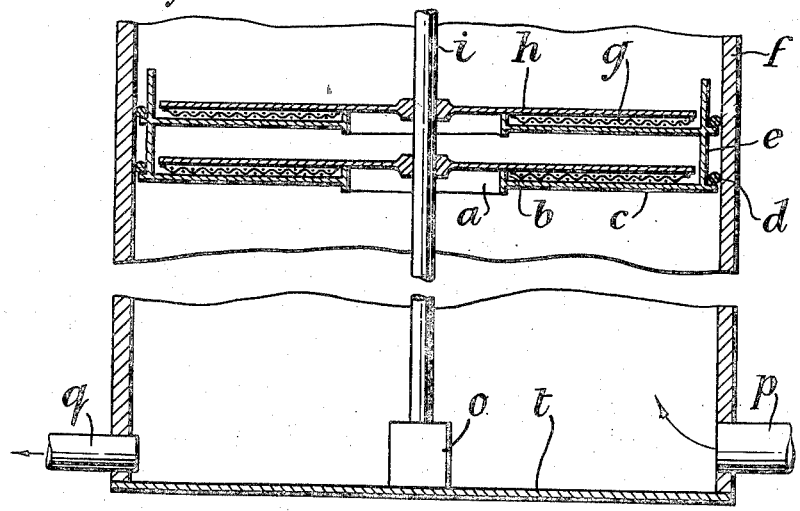
INVENTOR
André Macq,
BY Morris Spector
ATTORNEY Patented July 24, 1951

2,561,669

UNITED STATES PATENT OFFICE 2,561,669

DISTILLING AND RECTIFYING APPARATUS

André Macq, Uccle, Brussels, Belgium, assignor to Union Chimique Belge, Société Anonyme, Brussels, Belgium Application April 29, 1946, Serial No. 665,674
In Belgium April 25, 1945

3 Claims. (Cl. 261—81)

Distillation and rectification columns comprising the usual bell plates or plates with perforated bases have the disadvantage of forming apparatus having a great height. For this reason, it is frequently impossible to install the necessary number of plates for enabling mixtures of substances having boiling points which are near each other to be separated satisfactorily, and it is necessary to have recourse to multiple refluxes of the materials being treated; this influences the thermal balance of these installations very unfavourably.

The subject matter of the present invention is a distillation and rectification apparatus comprising a column of plates of very small height which enables substances having boiling points which are near each other to be separated whilst reducing the multiple refluxes to such an extent that they are very little in excess of the theoretical value. The small height of the plates enables columns of small bulk to be formed which do not necessitate the construction of special buildings to shelter them. The plates according to the invention are arranged in such a manner that a very sharp separation of the constituents of the mixture treated can be effected without bubbling the vapours in the liquids on the plates. A very low loss of pressure results; this is an advantage which enables the number of plates to be increased, if necessary in certain cases, whilst the height of the column remains considerably below the usual height of the columns at present employed. The small height of the column and the insignificant reflux enable an extraordinary thermal yield to be obtained and the consumption of heating steam to be reduced to a fraction of that ordinarily allowed for columns with bell plates. These same factors, added to the very thorough separation of the constituents to be rectified and the very small loss of pressure, enable, in addition, the economical rectification of mixtures of substances of very close boiling points to be envisaged, mixtures for which the separation by distillation and rectification has hitherto not been contemplated and which have had to be subjected to complicated chemical treatments.

The column forming the subject matter of the invention is constituted by identical vertically superposed elements, each of which comprises a fixed part and a movable part. The movable parts of all the elements of a column are fixed on a shaft such as hereinafter described. The attainment of the above and further objects will be apparent from the following specification taken in conjunction with the drawing forming a part thereof.

In the drawing:

Figure 1 is a longitudinal sectional view of the top of a column, with parts broken away, showing the movable members in their elevated positions; and Figure 2 is a longitudinal sectional view of the bottom of the same column, with parts broken away showing the movable parts in their lowered position.

Referring now to Figure 1 the fixed part is in the form of a circular plate $c$ which possesses at its centre a wide orifice $a$ that is bounded by a wall or strip $b$ which limits the height of the liquid remaining on the plates. Near the outer edge of this plate there is fixed a cylindrical sheet of metal $e$ on which is placed the upper plate which fixes the height of the elements of the column. All the elements of the column are surrounded by a cylinder $f$, closed at its two ends and suitably lagged. A packing $d$ may be placed between each of the plates and the cylinder.

The movable part of each element is in the form of a circular imperforate baffle plate or disc $h$ of sheet metal or other suitable material, the diameter of which is slightly less than that of the fixed plate, this disc bearing, on its bottom face at a distance of a few millimetres, an annular device with a large surface of contact and retention, which device is formed, for example, by one or more layers of netting and is represented diagrammatically in Figs. 1 and 2 by the broken lines $g$. The discs of all the elements of a column are fixed in a suitable manner on a vertical shaft $i$ placed at the axis of the outer cylinder and passing through the central orifices of the plates. Referring now to Figure 1, the end of the shaft $i$ passes through the upper end $s$ of the outer cylinder $f$. A delivery pipe $r$ is provided for the overhead vapours. Externally of the cylinder $f$ the shaft $i$ has a reciprocatory and rotary motion imparted thereto by any suitable mechanism indicated by the reference letter $m$. The effect of these movements is to cause the discs to rise in order to give a full passage to the vapours which rise between the fixed parts and the movable parts of the elements of the column and to cause them to descend until the device with a large surface of contact and of retention, which is fixed to the bottom of the discs, is immersed in the descending liquids spread on the plates. Fig. 2 shows the device at the moment of immersion. The bottom $t$ of the column $f$ has a suitable bearing $o$ for the vertical shaft $i$ and an inlet $p$ for vapours and an outlet $q$ for reflux.

The very small height of the plates and the movements described of the movable part have the effect of presenting to the vapours very large surfaces, which are wetted by the constantly renewed liquids, and of enabling multiple exchanges between the vapours and the liquids to take place, thus ensuring the rapid separation of the mixtures being rectified into their components. These circumstances favour the diminution of the reflux to almost the theoretical value.

The column described may be used both for continuous as well as for discontinuous working. In discontinuous working, the vapours coming from the boiler rise in the column by way of the first plate and meet, in counter-current, the refluxed liquids which drop from plate to plate through the wide central orifices and which, in falling, sprinkle the upper faces of the moving discs. The vapours lick the liquids on the plates and on all the very exposed surfaces of the movable parts as the result of trickling, wetting and splashing. At the periphery of the plates, the vapours undergo a change of direction of 180° and pass into the part formed by the top of a movable disc and the bottom of the plate above the movable disc where they have the opportunity of leaving the small drops which have been taken along mechanically or have been formed by condensation.

In a column such as the one described, which was equipped for discontinuous working and had a useful height of 150 centimetres and comprised 50 plates, 220 kgs. of a mixture of benzene and toluene were rectified. The separation of the constituents was extremely sharp. The ratio of reflux to distillate was less than 1 and the loss of pressure fluctuated between 120 and 140 mms. of water according to the momentary position of the movable discs; it therefore did not exceed 2.8 mms. of water per plate. 170 kgs. of benzene, of a quality superior to the standards of the Benzol-Verband (Benzene Association) were obtained. The liquid remaining in the boiler did not contain any trace of benzene and the fraction of 13.3 kgs. intermediate between benzene and toluene corresponded to about the liquid capacity of the column.

In continuous working, the liquid to be rectified was, as usual, heated to its boiling point and introduced on to an intermediate plate of the column. A result, which was comparable with that indicated for the discontinuous working, was obtained.

It has also been possible to rectify, with surprising success, in a single operation in the same column mixtures in which the boiling points of the constituents were only 10° C. apart, such as, for example, phenol and orthocresol, working under very favourable conditions of economy and avoiding the multiple rectifications with abundant refluxes which it is necessary to carry out in plate columns of the present-day type.

The column described may be employed under any conditions of pressure. The fact that it requires only one fluid-tight joint, which is favourably situated and is of small dimensions, predestines it for employment in vacuo. There may be given to the central orifice of the fixed plates $c$ a particular shape which increases the development of the length of the strip $b$ in relation to that which results from the employment of a merely circular central orifice.

The column described may also be employed advantageously for the washing of industrial gases.

I claim:

1. In a multiple plate distillation and rectification column, the combination of a vertical cylindrical column wall, a shaft coaxial therewith and guided for both rotary and reciprocatory movements, means for imparting said movements thereto, a plurality of superimposed annular imperforate baffle plates peripherally sealed and fixed upon said wall, a plurality of vertically spaced circular imperforate baffle plates coaxially mounted in said shaft for rotation and reciprocation therewith and alternately interposed between said annular plates; the central aperture in each of said annular plates being bound by an upstanding wall limiting the height of the liquid on the annular plates, a layer of contact material mounted on the under side of said circular plates, said material providing large surfaces for vapor contact and liquid retention and adapted to be alternately immersed in the liquid in the subjacent annular plates at the lower position of the reciprocable plates and elevated above the liquid in the upper position of the reciprocable plates, whereby the vapours traverse a generally upward and zig-zag path between the circular and annular plates.

2. Apparatus as defined in claim 1 wherein each of said layers of contact material has a thickness only slightly less than the height of said upstanding wall.

3. Apparatus as claimed in claim 1 wherein said annular plates are closely superimposed and wherein said reciprocable plates extend nearly to the outer periphery of said annular plates.

ANDRÉ MACQ.

REFERENCES CITED

The following references are of record in the file of this patent:

UNITED STATES PATENTS

| Number | Name | Date |
|---|---|---|
| 407,936 | Ledig | July 30, 1889 |
| 2,218,342 | Pegram | Oct. 15, 1940 |
| 2,387,231 | Bottoms et al. | Oct. 23, 1945 |

FOREIGN PATENTS

| Number | Country | Date |
|---|---|---|
| 3,870 | Great Britain | Feb. 25, 1884 |
| 7,536 | Great Britain | Mar. 25, 1911 |